US012755246B2

(12) United States Patent
Plouet

(10) Patent No.: US 12,755,246 B2
(45) Date of Patent: Oct. 6, 2026

(54) SYSTEMS AND METHODS FOR CORRELATING LARGE DATASETS OF ELECTRONIC DATA RECORDS

(71) Applicant: Nasdaq Technology AB, Stockholm (SE)

(72) Inventor: Corentin François Arthur Plouet, New South Wales (AU)

(73) Assignee: Nasdaq Technology AB, Stockholm (SE)

( * ) Notice: Subject to any disclaimer, the term of this patent is extended or adjusted under 35 U.S.C. 154(b) by 0 days.

(21) Appl. No.: 18/986,353

(22) Filed: Dec. 18, 2024

(65) Prior Publication Data

US 2025/0173677 A1 May 29, 2025

Related U.S. Application Data

(63) Continuation of application No. 18/321,175, filed on May 22, 2023, now Pat. No. 12,175,429, which is a continuation of application No. 17/341,944, filed on Jun. 8, 2021, now Pat. No. 11,694,159, which is a continuation of application No. 16/264,206, filed on Jan. 31, 2019, now Pat. No. 11,055,665, which is a (Continued)

(51) Int. Cl.

| | |
|---|---|
| ***G06F 7/00*** | (2006.01) |
| ***G06Q 10/00*** | (2023.01) |
| ***G06Q 10/10*** | (2023.01) |
| ***G06Q 30/06*** | (2023.01) |
| ***G06Q 40/04*** | (2012.01) |
| *G06Q 30/02* | (2023.01) |

(52) U.S. Cl.
CPC ............ *G06Q 10/10* (2013.01); *G06Q 10/00* (2013.01); *G06Q 30/06* (2013.01); *G06Q 40/04* (2013.01); *G06Q 30/02* (2013.01)

(58) Field of Classification Search
CPC ........ G06Q 10/10; G06Q 10/00; G06Q 30/06; G06Q 40/04; G06Q 30/02
USPC .................................................. 707/600–899
See application file for complete search history.

(56) References Cited

U.S. PATENT DOCUMENTS

| | | | | |
|---|---|---|---|---|
| 10,366,791 | B1 * | 7/2019 | Thiagarajan | G16H 50/20 |
| 2011/0035390 | A1 | 2/2011 | Whitehouse | |
| 2012/0271770 | A1 | 10/2012 | Harris | |

(Continued)

OTHER PUBLICATIONS

Angel, J. J., et al., “Equity Trading in the 21st Century”, Quarterly Journal of Finance, Feb. 2010, pp. 1-53.

(Continued)

*Primary Examiner* — Isaac M Woo
(74) *Attorney, Agent, or Firm* — Nixon & Vanderhye, PC

(57) ABSTRACT

A computer system is provided that stores reference data records and event data records that each correspond to one of the reference data records. Tokens are generated from the reference data records and sorted into subsets. Each reference data record that has a given token is included in the corresponding subset. A correlation value is calculated between members (e.g., the reference data records) of the subsets. The correlation values are calculated by determining a common time, calculating a reference value, calculating a percentage difference from the reference value, and then determining a correlation value (e.g., a correlation coefficient) using the percentage difference.

20 Claims, 7 Drawing Sheets

Related U.S. Application Data continuation of application No. 15/267,324, filed on Sep. 16, 2016, now Pat. No. 10,229,458.

(60) Provisional application No. 62/394,712, filed on Sep. 14, 2016.

(56) References Cited

U.S. PATENT DOCUMENTS

| | | | |
|---|---|---|---|
| 2018/0075160 | A1 | 3/2018 | Plouet |
| 2019/0164129 | A1 | 5/2019 | Plouet |
| 2021/0295265 | A1 | 9/2021 | Plouet |
| 2023/0359994 | A1 | 11/2023 | Plouet |

OTHER PUBLICATIONS

Colas, N., "Top 10 Reasons for Increased Asset Price Correlations", http://tabbforum.com/opinions/top-10-reasons-for-increased-asset-price-correlations, Sep. 2010, 4 pages.

Kwan, S., "On the Relation between Stocks and Bonds—Part II", FRBSF Economic Letter, http://www.frbsf.org/economic-research/publications/economic-letter/1996/july/on-the-relation-between-stocks-and-bonds-part-ii/_Jul. 1996, 9 pages.

* cited by examiner

SYSTEMS AND METHODS FOR CORRELATING LARGE DATASETS OF ELECTRONIC DATA RECORDS

CROSS REFERENCE(S) TO RELATED APPLICATION(S)

This application is a continuation of U.S. patent application Ser. No. 18/321,175, filed May 22, 2023, now allowed; which is a continuation of U.S. patent application Ser. No. 17/341,944, filed Jun. 8, 2021, now U.S. Pat. No. 11,694,159, issued Jul. 4, 2023; which is a continuation of U.S. patent application Ser. No. 16/264,206, filed Jan. 31, 2019, now U.S. Pat. No. 11,055,665, issued Jul. 6, 2021; which is a continuation of U.S. patent application Ser. No. 15/267,324, filed Sep. 16, 2016, now U.S. Pat. No. 10,229,458, issued Mar. 12, 2019; which claims the benefit of U.S. Provisional No. 62/394,712, filed Sep. 14, 2016, the entire contents of each being incorporated herein by reference.

TECHNICAL OVERVIEW

The technology described herein relates to correlating electronic data records. More particularly, the technology described herein relates to optimization techniques for determining correlations between electronic data records of a large dataset (or multiple different large datasets).

INTRODUCTION

In computing technology, the speed at which a process is completed can depend on the speed or amount of processing resources (e.g., amount of memory used, amount of time the process is given to execute with a CPU, the speed of the CPU, the number of CPUs, etc. . . . ) devoted to the process and the efficiency by which the process uses those processing resources.

One area where resource allocation may be relevant is in processing large datasets of electronically stored data (e.g., thousands or millions of electronic data records). One example of such processing may involve the identification of correlations between members of a dataset (e.g., where the dataset contains thousands or millions of data records). While this problem may be conceptually simple, it may be very resource intensive when a dataset of just 1000 records may require calculating 500,000 correlation coefficients. In order to calculate that many coefficients, a computer system may need an appropriate amount of resources (in terms of time and/or processing speed) devoted to the calculations.

While increasing the amount of processing resources may be one solution (e.g., just use more computers for the calculations), it may not always be possible, feasible, or desirable. Similarly, a dataset may be refreshed on a daily or weekly basis and the amount of time that can be devoted to obtaining the required calculations may be limited (e.g., in terms or minutes, hours, or one or two days). Thus, if the correlation processing takes too long, the data being correlated may become stale and out-of-date. Further, while the availability of processing resources has increased in recent years (e.g., through the cloud computing and the like), processing power is still a finite resource.

Accordingly, in these, and other areas of computing technology, new techniques for more efficient or optimized resource allocation are continually sought after. In particular, techniques for how the processes performed by a computer system may be optimized (e.g., to improve speed and/or efficiency of the performed process) and/or how the processing resources of such systems may be allocated are continually sought after.

SUMMARY

In certain example embodiments, a computer system is provided that includes an electronic storage system, a transceiver, and a processing system. The electronic storage system is configured to store a plurality of reference data records that includes an identifier and a description string. The storage system is configured to store event messages that each include data regarding data transaction requests performed by other computing systems, and each of the event messages correspond (e.g., by expressly including the identifier in the event message) to one of the plurality of reference data records and include a numerical value and a timestamp. In certain examples, the transceiver is configured to receive event messages from multiple different remote or external computing sources. The processing system is configured to generate tokens from a description string that is included with each of the reference data records. The tokens are used to generate a plurality of subsets, where reference data records with the same tokens are placed into the same subset (e.g., one subset corresponds to one tokenized word that includes all reference data records with that token). A correlation value is then determined between the members of each subset. The determination of a correlation value includes determining a common time frame to use for the event messages, determining a reference point for each reference data message, and calculating a percentage difference between the reference point and each numerical value included in an event message with the corresponding reference identifier. The correlation value is calculated from the percentage difference for the two reference data records.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. . . . in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system is programmed to tokenize each one of a plurality of reference data records (or a string field of that record). In certain instances, multiple tokens are generated from a single reference data record. The generated tokens are grouped into different subsets based on the resulting token so that, for example, the same or similar tokens are grouped into the same subset. In certain examples, the subsets are ordered based on the number of different reference data records associated with the token for that subset.

Different electronic data messages are received for each one of the reference data records. A correspondence value between members of the same subset are then calculated using the electronic data messages. In certain instances, the values included with the electronic data messages associated with a given subset of reference data records are normalized. The correlated data may be presented as part of a user interface on a client computer system. In certain examples embodiments, the techniques described herein may be used to identify a graph of correlated instruments of different types (e.g., stocks, futures, ETFs, etc. . . . ) traded across different electronic exchange computing systems.

Figure 1:
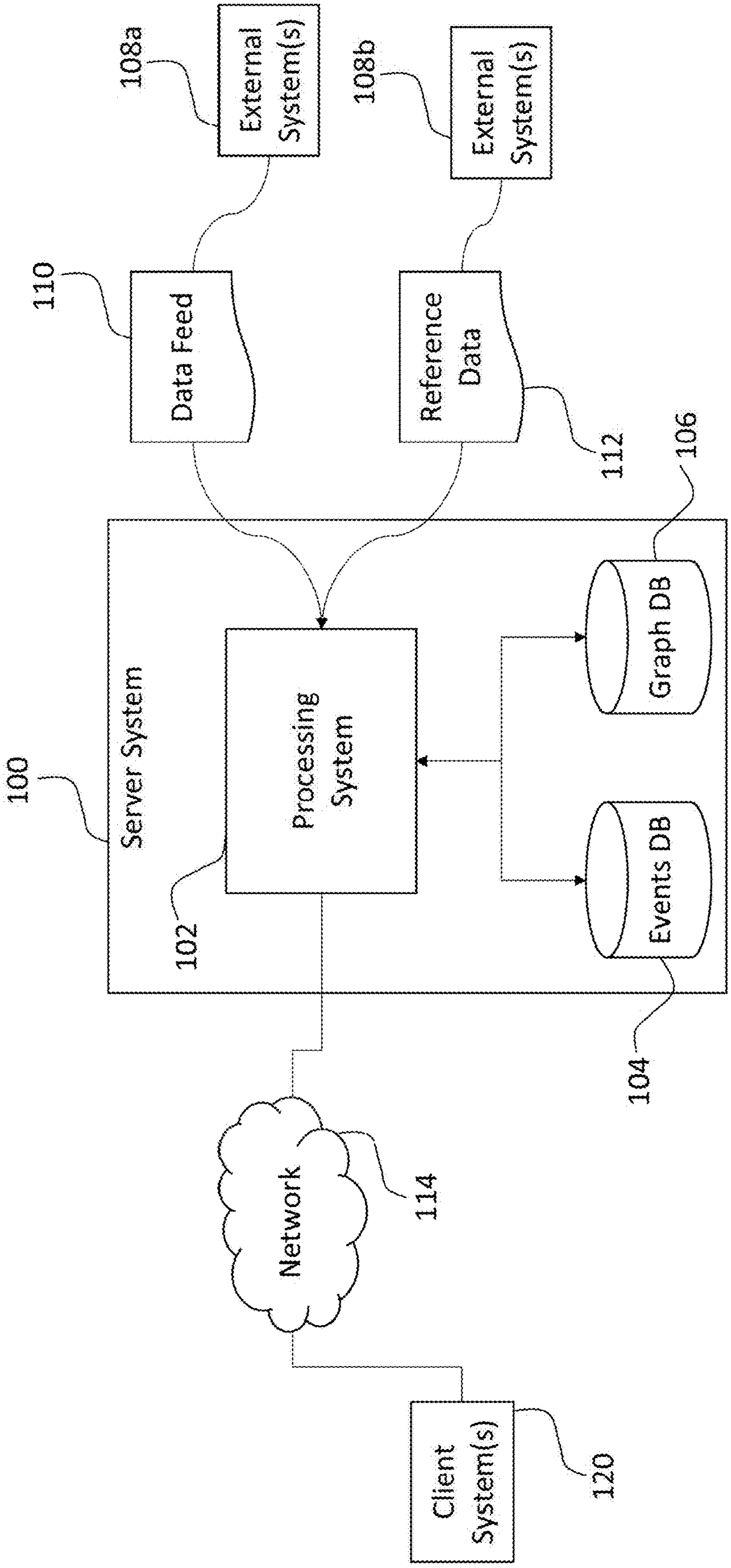
FIG. 1 illustrates a non-limiting example function block diagram of a computer system programmed to determine correlations between records of a stored dataset.
Figure 2:
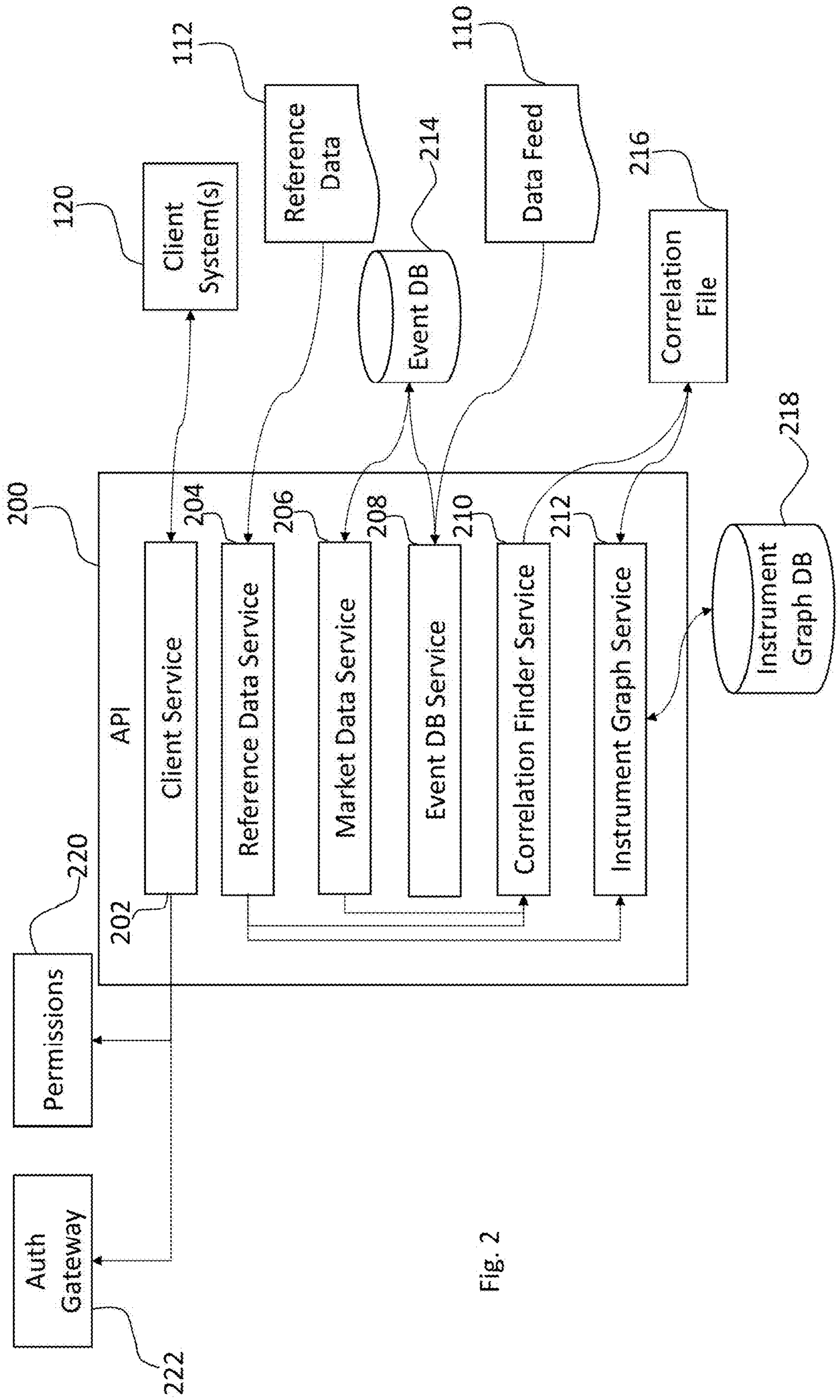
FIG. 2 illustrates a non-limiting example function block diagram of an application programming interface (API) implemented on the computer system of FIG. 1.
Figure 3A:
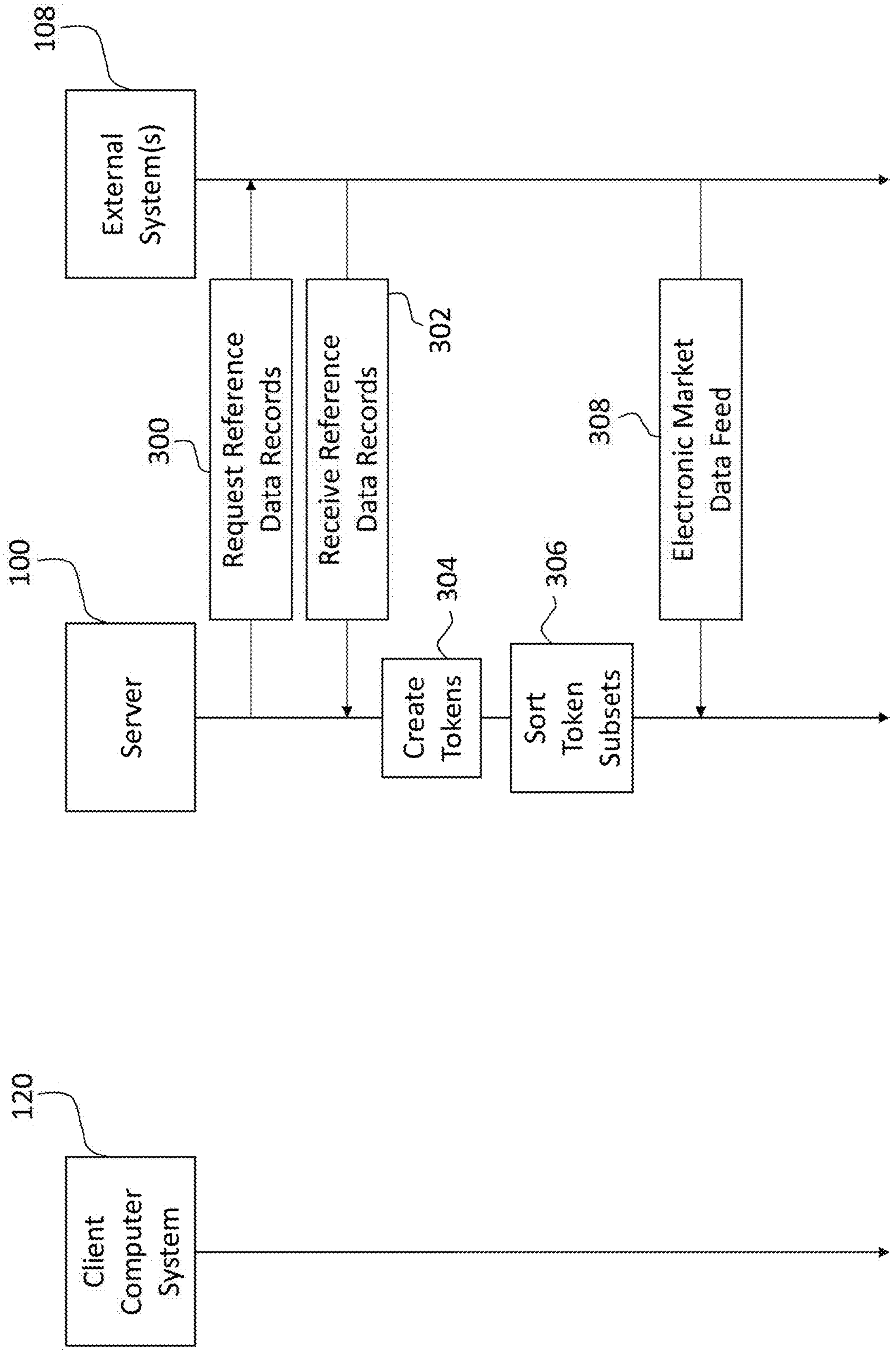
FIGS. 3A and 3B are signal diagrams showing a process implemented on the components of FIG. 1.
Figure 3B:
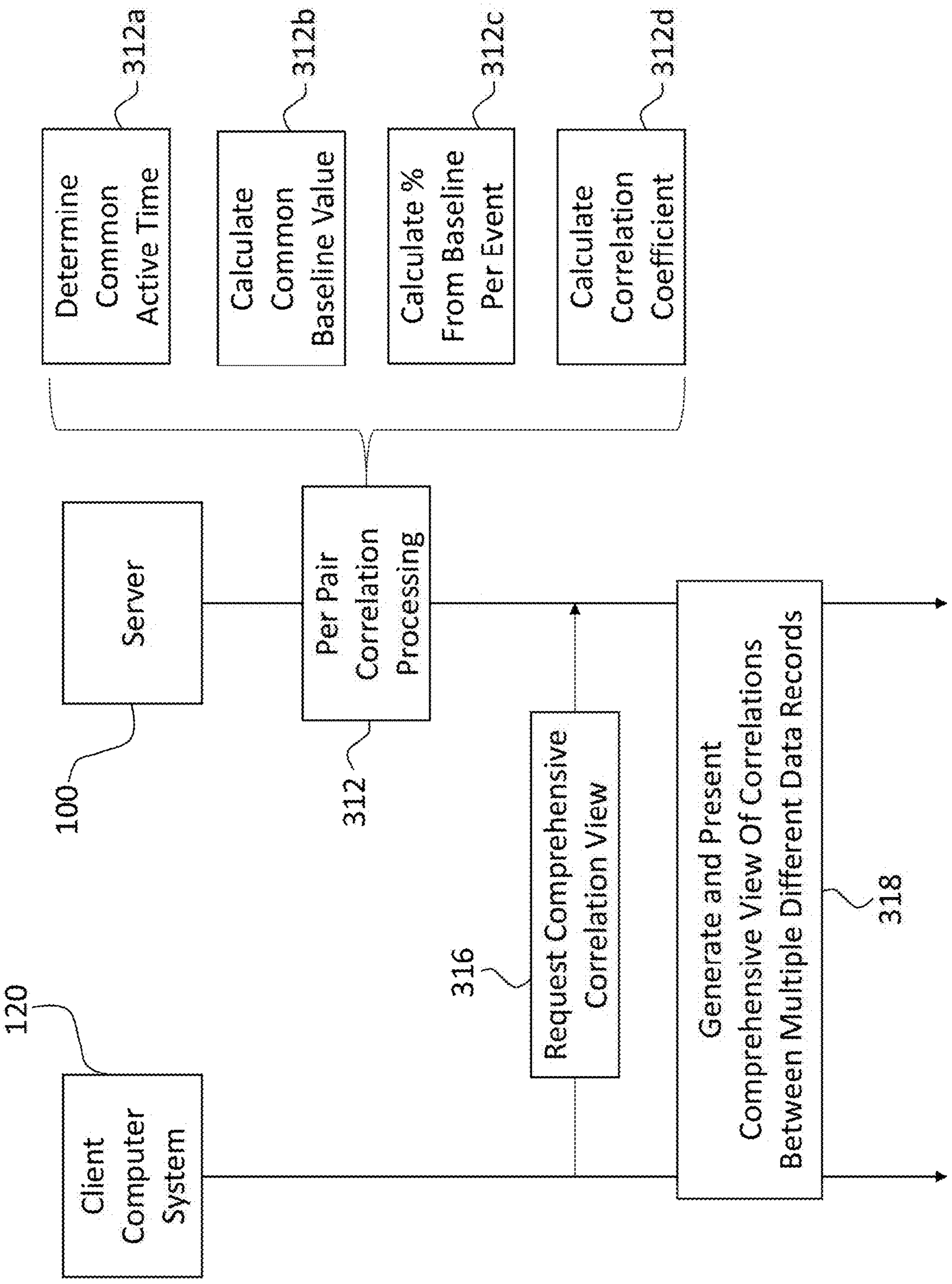
Figure 4A:
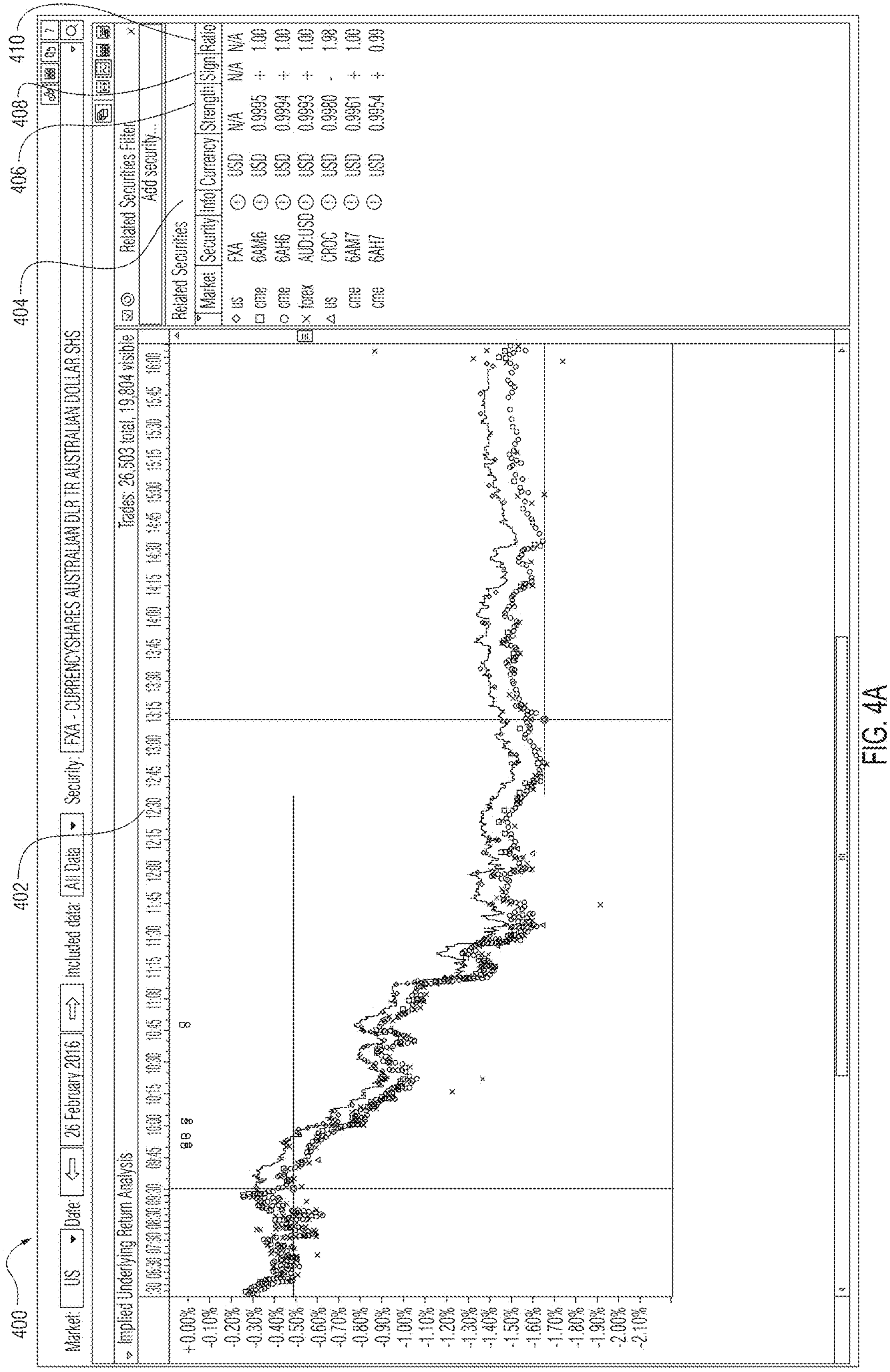
FIG. 4A is a wireframe illustration of an example user interface that displays correlations between records of a dataset and FIG. 4B shows two popup windows that are displayed over the example user interface of FIG. 4A.
Figure 4B:
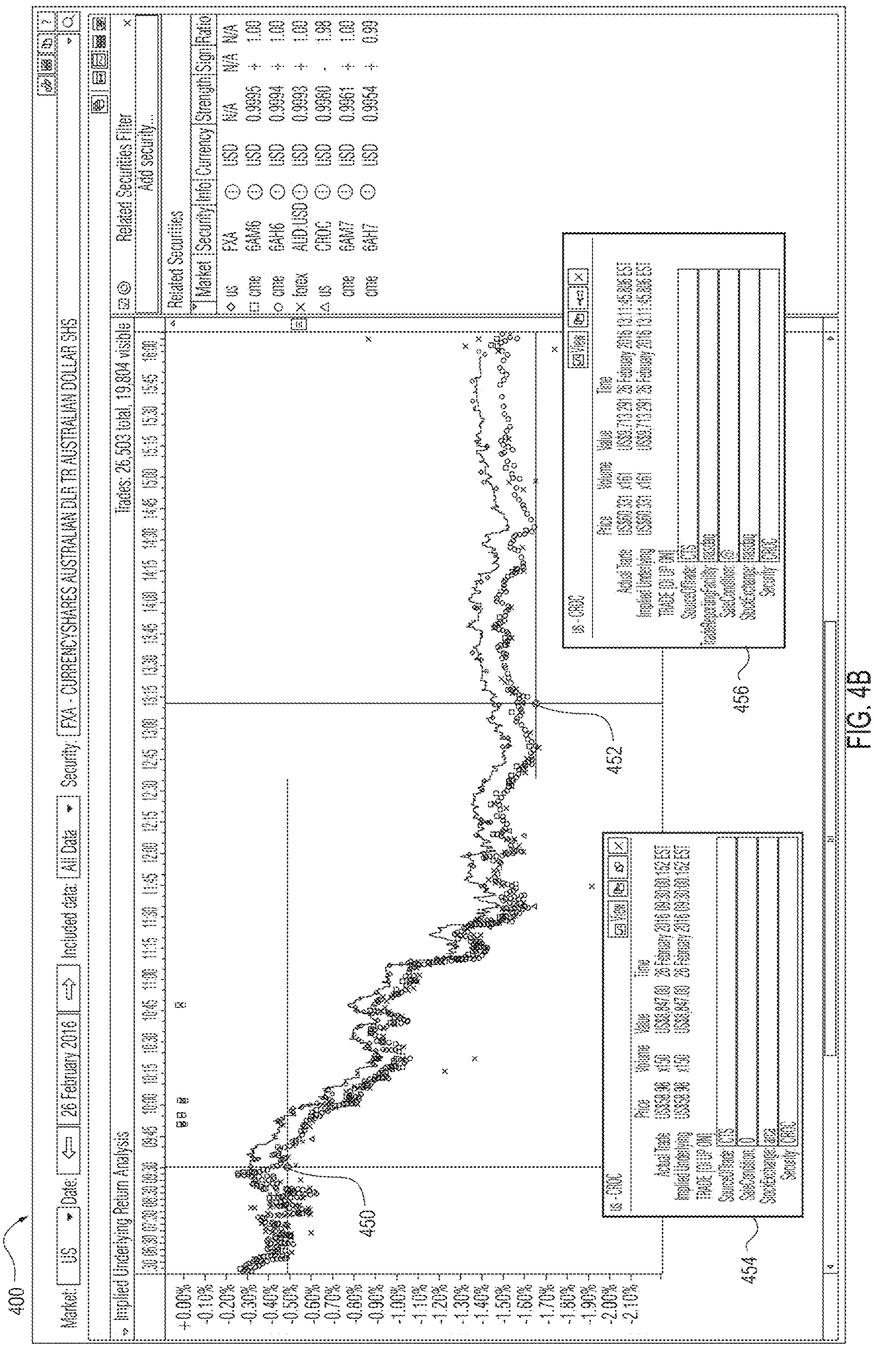
Figure 5:
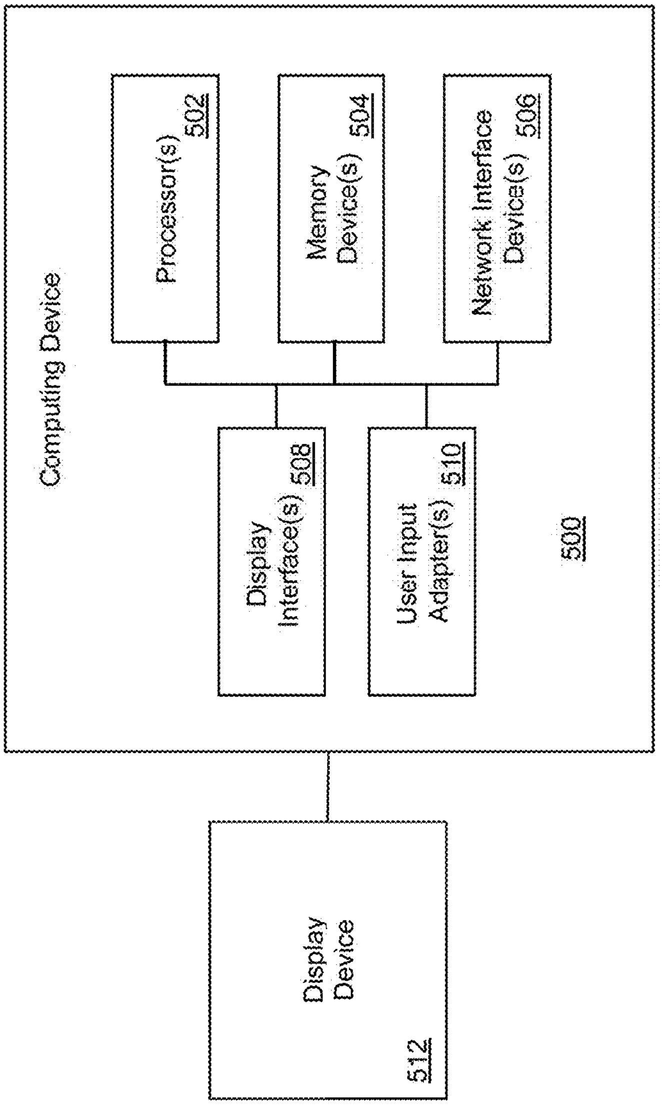
FIG. 5 shows an example computing device that may be used in certain example embodiments to implement features described herein.

FIG. 1 illustrates a non-limiting example function block diagram of a computer system programmed to determine correlations between records of a stored dataset and FIG. 2 shows an example API that may be used to implement the correlation techniques on the computer system of FIG. 1. FIGS. 3A and 3B show an example signal diagram of processing performed between the components in FIG. 1. FIGS. 4A and 4B show an example display screen that may be presented on a client computer device (e.g., in FIG. 1) to illustrate correlations between different reference data records. FIG. 5 shows an example hardware architecture used, in some embodiments, to implement the features shown in FIG. 1 through FIGS. 4A and 4B.

In many places in this document, including but not limited to the description of FIGS. 1 and 2, software modules (e.g., a software program, service, library, process, thread, or the like) and actions performed by such software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 5.

Description of FIG. 1

FIG. 1 illustrates a non-limiting example function block diagram of a computer system programmed to determine correlations (e.g., a correlation coefficient) between reference data records.

Server computer system 100 is a computer system or a group of computer systems (e.g., a distributed computer system) that includes processing system 102 (e.g., one or more central processing units—CPUs—and memory for executing computer executable instructions). In certain examples, the server system includes one or more of computing device 500 from FIG. 5. Server system 100 is programmed to save, store, and access databases 104 and 106.

In certain examples, databases 104 and 106 are included on the same physical computer system 100 (e.g., stored in local storage for that computer system such that network access is not required for accessing the data in the database) and in other examples one or both of the databases 104 and 106 are provided on separate computer systems. In certain examples, databases 104 and 106 are included in the same logical database (but may be stored in separate tables within that same database).

In certain examples, an individual server computer system is dedicated to one client (e.g., an account that is associated with a unique entity) and the data stored for that client on that single computer system is unique to that client. For example, a particular broker-dealer may work with (e.g., trade on) 25 different electronic trading exchanges. Data (both reference data and market data) from those exchanges and data from the broker-dealer may be imported or received by a server computer system 100 that is dedicated to calculating correlation coefficients for instruments for that client. And another server computer system may have another set for data that is unique for another client. Accordingly, the server computer system 100 may include many different servers that are each programmed to deliver their own unique view of the reference and market data for a corresponding client.

Processing system 102 is programmed or configured to execute computer code and process data in the databases 104 and 106. In certain instances, processing system 102 determines (in conjunction with a computer program) which reference data records are to be placed into the same subset. This process is described in more detail in connection with FIGS. 3A and 3B. In certain instances, the processing system is programmed or configured to perform a coefficient calculation process that determines a correlation coefficient. In certain examples, the calculated correlation coefficient is the Pearson product-moment correlation coefficient.

Database 104 is a database that stores electronic data messages received via data feed 110 from external systems 108*a*. In certain examples, the electronic data messages are part of a market data feed such as Nasdaq's TotalView-ITCH electronic data feed. In certain implementations, there may be hundreds of different data feeds that are received by server system 100. Electronic data messages and the data contained on those messages is also referred to as event data herein. The event data is used when calculating a correlation coefficient between reference data records. In certain examples, the data stored in the events database 104 is only stored for a set period of time (e.g., 1 day, 1 week, or 2 weeks) until it is overwritten.

Database 106 may be a graph database that stores reference data records using a graph data structure. A correlation coefficient may be calculated between two reference data records that are linked via this graph data structure. Reference data records can include data fields that provide information about an instrument or security that is (or has been) electronically processed by an external computer system.

Reference data records 112 are transmitted to server system 100 from external system(s) 108. External systems 108(*b*) may include computer exchange systems (e.g., such as the NASDAQ computer stock exchange), computers associated with the individual clients, or other third party services that provide reference data. For example, a broker-dealer organization may transmit a list of reference data records to the server system 100 that are then added to the graph database 106. In other examples, external systems 108(*b*) may be automated exchange computer systems. The external systems are "external" to the computer system that performs the techniques described herein. However, in certain examples, an exchange computer system may implement the techniques described herein to identify correlations.

In certain example embodiments, the graph database 106 is a Neo4j database. Each record of the stored reference data records may include a description of the properties of an instrument and an identifier for that instrument. Each different instrument may have its own unique identifier (e.g., an alpha-numeric string) that is used to uniquely identify that instrument among all other reference data records. In various embodiments, the instruments can include stocks/equities, exchange traded funds (ETFs), futures, options, swaps, bonds, instruments that represent currency, foreign exchange transactions, commodity instruments, other types of securities aside from those listed earlier in this sentence, and/or any type of instrument that is tradable on an electronic exchange computer system. The reference data records are used to organize the data before the coefficient processing is performed.

In certain example embodiments, a distributed server system is provided that includes multiple client-specific servers. In certain examples, each client-specific "server" may correspond to single computer system. In certain examples, each client-specific server may correspond to a "virtual" machine. In certain examples, the server system 100 is a distributed server system that includes one or more physical computer systems that operate plural virtual machines. In certain examples, the client-specific servers access the same centralized database that holds reference and/or event data. Each client-specific server may then operate on the reference and/or event data according to the needs of a particular client (e.g., some event data may be relevant to certain clients, but not others).

In certain examples, the event data is market data (e.g., historical records of events from an order book on an electronic exchange computer system). In certain examples, the event data is used to calculate intra-day price returns at different points in time, which are then used to determine if two reference data records are highly correlated (in other words, whether the two traded instruments represented by the two reference data records are highly correlated). In practical terms, these correlations rely on the fact that market participants, like arbitrageurs and market makers, continuously enforce the 'law of one price' (LOOP) across markets. This makes reference data records that track the same underlying factor closely track each other.

In certain examples, the process performed on the server identifies the strength of the correlation (e.g., the correlation coefficient), as well as the direction (which can be negative, in the case of, for example, an inverse ETF compared to long ETF tracking the same index), and the ratio between the intra-day volatilities of the two instruments. This calculation can be used to normalize the returns (for example, when dealing with both traditional long ETFs and leveraged ones, such as a twice leveraged ETF). The calculated coefficient between two instruments may then be added to the graph in the graph database. In other words, the calculated coefficient may be added as a property of the edge that links one reference data record to another.

Once a correlation coefficient has been calculated, the server system 100 and/or client system(s) 120 may generate a user interface display to present both the calculated correlation coefficient and how the event data for a given instrument compares to one or more other instruments. In certain examples, the user interface is generated on the server system and transmitted to via network 114 (e.g., the Internet) to client system(s) 120. This may be in the form of a report or the like. In other examples, the data that is used to generate the user interface display is transmitted over the network 114 to the client system(s) 120 where a client side software application may take the data and render a display for viewing by a user.

Description of FIG. 2

FIG. 2 illustrates a non-limiting example function block diagram of an application programming interface (API) that may be implemented on the server computer system of FIG. 1.

API 200 includes multiple different services that may be accessed by internal (e.g., processing system 102) and/or remote systems (e.g., external system 108 or client system 120). The API 200 includes client service 202, reference data service 204, market data service 206, caching service 208, correlation finder service 210, and instrument database (DB) service.

Client service 202 is used to authenticate and authorize client systems 120 by interfacing with a permissions database 220 and an authentication gateway 222. For example, a request is transmitted from the client system 120 to the server system 100. The request is handled by the client service part of the API 200. The request may include, for example, an authentication request that includes a username and password. This request is passed onto the authentication gateway 222 to authenticate the request. Once authenticated, then the client service will interface with a permissions database to determine what resources and/or data the client computer system 120 should have access to. For example, the requesting client computer system may be only authorized to access some of the subsets of data and/or services that are offered by the server 100 and/or API 200. In certain examples, the client service 202 may only authorize a client to view some of the event data that is used to calculate a correlation coefficient. For example, clients may subscribe to certain subsets of event data depending on the types of events they wish to monitor.

Reference data service 204 is used to import or receive reference data 112 from external systems 108. Reference data service 204 calls both the correlation finder service 210 and the instrument DB service 212.

Market data service 206 imports and/or receives electronic data messages from data feed 110 via event database 104. Specifically, electronic data messages are received via event DB service 208. Service 208 interacts with event DB by writing the messages and/or the events contained in those messages to event DB 214. The messages are then subsequently accessed by market data service 206. In certain instances, the events database 104 may be a cache for the event information that is received via data feed(s) 110. The electronic data feed 110 can include multiple different electronic data feeds (e.g., hundreds or thousands of different electronic data feeds that may each includes thousands, millions, or billions of messages on the respective event feed) from different electronic exchanges that provide information on order book activity of those respective exchanges. For example, a single electronic message included in one electronic feed may include data that indicates 100 (e.g., an amount) of instrument X (e.g., an instrument or reference identifier) was sold for 99 (e.g., a transaction value or a transaction price), a timestamp may also be included in the electronic message that corresponds to when the electronic exchange processed the data transaction request related to the message. In certain instances, the timestamp includes information to identify the millisecond or microsecond of when the transaction occurred.

Correlation finder service 210 includes functionality for identifying reference data records for which correlations will be calculated. This process is described in greater detail below.

Instrument DB service 212 communicates with database 218. Both the correlation finder service 210 and the instrument DB service 212 interface with correlation file 216. In certain examples, the correlation finder service determines the correlations and saves those correlations to correlation file 216. The instrument graph service 214 then accesses the correlation file and builds, updates, or creates a graph database of the correlations in instrument graph DB 218. In certain examples, the correlation file 216 is updated on a daily or weekly basis (e.g., over the weekend). In certain examples, the instrument graph DB 218 is created and then used as a read-only database (e.g., that is not updated). Instead, the database may be deleted and rebuilt on a daily or weekly basis.

Description of FIGS. 3A-3B

FIGS. 3A and 3B are signal diagrams showing a process implemented on the components of FIG. 1.

In step 300 the server computer system 100 sends a request to external computer systems 108 to obtain reference data records. In certain examples, this step may be preceded by the client computer system 120 registering with the server computer system 100 what data sources to use for the reference data. In step 302, the electronic reference data records are delivered to the server computer system 100 from external systems 108. In certain examples, the reference data records include at least one string (e.g., a description) of the instrument (e.g., a ticker) that is listed or otherwise traded on a given electronic exchange.

The electronic reference data records received from the external computer systems 108 are then stored to a database or other storage. In step 304, the electronic reference data records are tokenized to thereby generate one or more tokens (usually plural tokens) per reference data record. The following are examples of electronic reference data records according the techniques described herein.

TABLE 1

| Instrument | Description (Instrument Long Name) |
|---|---|
| A | ISHARES NASDAQ 100 INDEX ETF |
| B | E-MINI NASDAQ 100 FUTURES SEP15 |
| C | NASDAQ OMX GROUP |

Here, the string in the description field of each electronic data record may be tokenized to create the following different subsets of tokens.

TABLE 2

| Subset (token) | Set Members |
|---|---|
| ISHARES | A |
| NASDAQ | A B C |
| 100 | A B |
| INDEX | A |
| ETF | A |
| E-MINI | B |
| FUTURES | B |
| SEP15 | B |
| OMX | C |

In certain examples, there may be more than one token assigned to a subset. For example, the name S&P500 may be used for one instrument on one market and the name SP500 may be used for another instrument traded on a different market. In this instance, the two may be grouped into the same subset and instruments that have either token may be added to the same subset.

From this group of subsets, those subsets with only one member are removed leaving the "NASDAQ" and "100" subsets (naturally in a commercial setting there may be thousands or millions of different tokens). The remaining tokens that are associated with two or more reference data records are then ordered in reverse order in step 306. The sorting allows the processing system to calculate coefficients between those subsets with the narrowest data range. In other words, if a subset only has two members (perhaps the name of a company) those two reference data records may be determined (as discussed below) to be highly correlated. In certain examples, subsets that are associated with more than a threshold number of reference data records are also ignored. For example, if more than 10,000 reference data records are associated with a given token. For example, the term "ETF" may be associated with many different types of records and calculating a correlation coefficient between members of such a set may not provide for finding reference data records that are highly correlated. The subsets and the data records thereof are then stored into a graph database 106.

In step 308, electronic data messages (e.g., market data) are received from different electronic exchange platforms. These data messages are cached (e.g., as discussed above via the event DB service 208).

Continuing in FIG. 3B, correlation processing is performed per pair of reference data records that are within the same subset. For example, referring to table 2, correlation processing may be performed for the members of the "NASDAQ" subset. Thus, pair processing may be performed between A and B, A and C, and B and C.

The per pair correlation processing of step 312 includes sub-elements 312*a*, 312*b*, 312*c*, and 312*d*.

In step 312*a*, a common activity time for the two reference data records is determined. For example, one of the paired reference data records is an instrument that is traded on an electronic exchange based in London. The other reference data record is for an instrument that is traded on an electronic computer exchange system in New York. In such an instance, the time period for when the London based instrument is active (e.g., when it can be traded on the London exchange) is different from the time period for when the New York based instrument is active. Accordingly, in step 312*a*, the process determines a common time frame for when both instruments are active or available for trading. This is accomplished by analyzing the event data associated with the respective reference data records to determine the time period when both are active (e.g., when both are actively trading). Thus, in the case of the London (open between 8 AM and 430 PM GST) and New York (open between 930 AM and 4 PM EST), a common time for when both instruments are active may be determined as being between 930 AM to 1130 AM EST.

Once a common active time frame is determined, the process determines a baseline (e.g., a common starting point) for the two reference data messages in step 312*b*. These baselines will be used in calculating the correlation coefficient (e.g., based on the "return" or percentage difference from that baseline) between the respective reference data messages using corresponding event messages (e.g., those event messages that are within the determined common time frame). In certain example embodiments, the baseline value for a reference data message is determined using the price or value of the first event data messages within the common time frame. In certain examples, the baseline value is determined using an average price or value of the event data messages (e.g., that is taken over the first 10 seconds of the common time frame).

In step 312*c*, the process determines the percent return from the baseline for each reference data message using the event data for that reference data message. In certain examples, the percent return for a given reference data message (e.g., an instrument) may be graphically displayed (as is shown in FIG. 4A). The percent return is calculated for each of the paired reference data messages. In certain examples, the percent return is calculated to each event data message within the common time window. In certain examples, the percent return is calculated for a subset of the event data messages within the common time window (e.g., selected at random from all of the event data messages).

In step 312*d*, the process performs correlation coefficient processing by using the percent return data calculated in step 312*c*. In certain examples, a correlation coefficient is calculated between the calculated percent return values associated with event data messages that have timestamps within a certain threshold value. For example, 10 ms, 50 ms, 100 ms, 1 second, or there between.

In certain instances, one of the outputs from the correlation coefficient processing may be a ratio between the returns. For example, a twice leveraged instrument may be correlated to a normally leveraged instrument. In other words, every 1% of change for the normally leveraged instrument may result in 2% of change for the twice leveraged instrument. In such a case, the correlation coefficient may be calculated to be between −1 (a perfect negative correlation) and 1 (a perfect correlation). This is shown as the strength column 406 in FIG. 4A.

When the correlation coefficient is calculated another ratio (e.g., the ratio of standard deviations between the first set of events for the first reference data record and the second set of events for the second data record) may also be determined. This ratio may be calculated between 0 and an positive number. This may indicate the difference in "leverage" between two tradable instruments.

This ratio is shown in ratio column 410 of FIG. 4A where the "CROC" ticker is associated with a 0.998 correlation coefficient and a ratio value of 1.98 with respect to the FXA instrument.

Once a correlation coefficient is calculated between two reference data records the calculated correlation coefficient may be stored to the correlation file and/or correlation database for later use as shown in FIGS. 4A and 4B.

In certain examples, the correlation processing for the identified subsets may be performed on a multi-core processor. In such a case the calculation of the cross correlations for the largest sets may be scheduled before the smaller sets. This type of scheduling may facilitate a quicker completion of the calculation processing for all sets and increase the overall percentage of CPU cores being used during the lifetime of correlation processing.

In certain example embodiments, the process for calculating correlations between the members of a given data set starts by retrieving all of the electronic data messages (e.g., market data) for the reference data records of that subset. In certain examples, retrieving all of the electronic data messages prior to calculating the correlation coefficients can result in run-time performance improvements for the correlation process.

In certain example embodiments, the correlations for a given subset are computed in the following order: first reference data record "A" against all other reference data records of that subset; then 2) reference data record "B" against all remaining reference data records (excluding A). This type of implementation may improve cache performance as one of the variables in the correlation calculation is unchanged from calculation to calculation.

In certain example embodiments, the normalization of the market data occurs during the correlation calculation (e.g., by calculating the percent return). It will be appreciated that the market data associated with different reference data records may have originated from different sources and/or be associated with different types of reference data records. For example, one may be associated with an ETF while the other is associated with futures.

In certain example embodiments, a time range for the electronic data records that are to be used in computing correlation coefficient is determined. In certain examples, market data from the first X minutes (or seconds) of the opening of an electronic exchange or the last Y minutes (or seconds) of the closing of the electronic exchange are excluded from this calculation. This may be helpful at the start of the data, because that is where the value used as a reference point to compute the intra-day returns may be determined.

In certain examples, the processing system of the server determines and stores a time-stamped data point for every time the best bid or ask price for the reference data records changes. With this information, only a portion of the electronic data messages are used as input for the correlation calculation. In certain examples, only those electronic data messages that are within X milliseconds of the change are considered. This number may be adjustable and provide a time range in which arbitrageurs tend to react (e.g., they react very quickly to price changes in one instrument by taking action in another instrument).

The processing system may be programmed to keep track of the ratio of time-stamped points to the number of available samples within the range of that point. This ratio may then be used later to score the results (e.g., a ratio of 90% may mean that almost every time one instrument changed its price, the other one changed its price soon after). In certain examples, the first comparable point (e.g., the first point in each instrument for which the time stamp is close enough to the other one), or an average of multiple points, is used as a reference point, to compute the intra-day returns. Each subsequent point is used to obtain the return for each instrument.

Once correlation data is calculated for a given pair of reference data records that information is added to a database. For example, a database may link (e.g., via a graph data structure) reference data record A with reference data record B. Accordingly, when a correlation coefficient is calculated between the instruments associated with those data records, the correlation coefficient may be added to the database. This information may then be requested by client computer systems 120 via the API shown in FIG. 2 to generate user interface display screens. Example user interface display screens are shown in FIGS. 4A and 4B.

In certain example embodiments, further correlations between instruments (and/or the reference data records associated with those instruments) not within the same subset may also be calculated. In particular, if instrument A is correlated with instruments B and C, then B and C are also likely to be correlated. If the correlation coefficient is above the threshold, then a link between B and C (and the corresponding correlation value) may be added to the graph database. In certain example embodiments, when a correlation coefficient of 0.997 or above is calculated between two reference data records, those records may be classified as highly correlated according to the techniques described herein.

Tables 3 and 4 show an example of how there can be a second correlation step performed that takes members from different subsets and determines a correlation coefficient between those members (as discussed in the above paragraphs). For example, step 312 in FIG. 3B may be performed once to determine coefficients between members within the same subset and another time on members of different subsets that share a common instrument. Table 3 shows example instruments and table 4 shows some of the tokens and resulting subsets that may be generated through the tokenization process.

TABLE 3

| Instrument | Description (Instrument Long Name) |
|---|---|
| X | UNITED STATES OIL FUND, LP |
| Y | NFX WTI CRUDE OIL FINANCIAL FUTURES MAR16 |
| Z | WTI CRUDE FUTURES-WTI-MAR16 |

Instrument X is a fund instrument that tracks the price of West Texas Intermediate (or WTI) crude oil listed on the New York Stock Exchange (NYSE). Instrument Y is futures on WTI crude oil that are listed on the Nasdaq Futures Exchange. Instrument Z is futures on WTI crude oil listed on the ICE exchange. From these instruments the following subsets may be generated using the tokens generated from the description strings.

TABLE 4

| Some Example Subsets (token) | Set Members |
|---|---|
| OIL | X, Y |
| WTI | Y, Z |
| CRUDE | Y, Z |
| FUTURES | Y, Z |

Instruments X and Y belong to the same subset of instruments for the token "OIL." Thus the process may calculate a high correlation between instruments X and Y during the first correlation step.

Instruments Y and Z belong to the same multiple subset (WTI, CRUDE, FUTURES). In certain examples, the subset for token "FUTURES" may get ignored or discarded for the correlation process (e.g., because there may be too may members). In such an instance, instruments Y and Z still belong to the subsets for the more specific tokens "WTI" and "CRUDE." Thus, the process may find a high correlation between instruments Y and Z during the first correlation step (step 312 in FIG. 3B). In certain example embodiments, when a correlation has already been determined between two instruments as a result of previous analysis, the process may determine that such a calculation has already been performed and thus not calculate the correlation coefficient again. Instead, the previously calculated value may simply be taken and stored with the new subset. Accordingly, the calculated correlation coefficient for Y, Z when the WTI subset is analyzed may be assigned to Y, Z when the CRUDE subset is analyzed.

After determining correlation coefficients for members within a subset, a second correlation process may be executed. In this second correlation process, correlations are computed between instruments irrespective of a particular token, but rather are computed with respect to a particular instrument. In other words, the process computes correlations between instruments that are highly correlated with a reference instrument. In the above case, instrument X is determined to be highly correlated with instrument Y and instrument Z is also highly correlated with instrument Y (e.g., instrument Y is the "reference" instrument). Accordingly, the process calculates the correlation coefficient (e.g., via steps 312*a*, 312*b*, 312*c*, 312*d*) between X and Z—this is despite the fact that X and Z do not share any common tokens (instead they share a common correlated instrument).

In step 316 a request is received from a client computer system 120 to view a comprehensive correlation view of at least one of the determined subsets of reference data records. An illustrative example of a comprehensive view is shown in FIGS. 4A and 4B discussed below.

In step 316 a request is received from a client computer system 120 to view a comprehensive correlation view of at least one of the determined subsets of reference data records. An illustrative example of a comprehensive view is shown in FIGS. 4A and 4B discussed below.

In response to reception of a request to view correlations, the server computer 100 and/or the client computer system 120 may generate such a view in step 318 using the reference data records and corresponding relations stored in the graph database and/or the electronic data messages associated with the respective reference data records stored in the events database. An illustrative example of a generated view is provided in the wireframe drawings of FIGS. 4A and 4B discussed below.

Description of FIGS. 4A-4B

FIGS. 4A and 4B are wireframe illustrations of an example user interface that displays correlations between reference data records of a dataset.

In FIG. 4A, a user interface display screen 400 may be generated on the server computer system 100 and/or client computer system 120 in FIG. 1 based on the correlation data calculated by the server system 100. For example, the server system 100 may generate data that is transmitted to the client system 120, which is then used to generate the display screen 400.

Display screen 400 shows correlations between an instrument with an identifier of "FXA" and instruments with identifiers of "6AM6, 6AH6, AUD:USD, CROC, 6AM7, and 6AH7." The display screen 400 includes a graph 402 that includes calculated data points for the return of the instruments. As shown in the graph, all of the instruments are correlated above a threshold amount (e.g., above a 99.7 or 99.8% correlation coefficient).

On the right side of the display screen 400, a table view 404 shows the details of the instruments and the nature of the correlations between those instruments and the FXA instrument. The table view 404 includes a column with the correlation coefficient 406 (labeled strength), a sign column that indicates if the instrument is inversely related to the FXA instrument, and a ratio column that indicates the ratio to the FXA instrument, and a "market" column to indicate from which electronic exchange the event data for the instrument is obtained. As shown in FIG. 4A, the CROC instrument is inversely related and is almost double the returns of the FXA instrument.

In certain examples, when the display screen 400 and/or graph 402 are generated using the sign and/or the ratio. This effectively normalizes the return information initially calculated and allows for a more comprehensive view of the correlations between two instruments that may not, at first, appear to be correlated (e.g., because they are inversely correlated with a non-one-to-one ratio).

FIG. 4B is the same display screen in FIG. 4A with additional graphical elements that appear when an individual event record is selected from graph 402 (e.g., by a user using a keyboard, mouse, or other input device). Specifically, event data related to 450 is shown in window 454 and event data related to 452 is shown in window 456.

Description of FIG. 5

FIG. 5 is a block diagram of an example computing device 500 (which may also be referred to, for example, as a "computing device," "computer system," "computing system," or "server computer system") according to some embodiments. In some embodiments, the computing device 500 includes one or more of the following: one or more processors 502; one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the processors 502 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown in FIG. 5) that are included in, attached to, or otherwise in communication with the computing device 500, and that output data based on the received input data to the processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown in FIG. 5) such as, for example, a keyboard, mouse, trackpad, touchscreen, etc. . . .

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc. . . .

In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively or additionally, in some embodiments, the computing device 500 includes one or more of: a processing system that includes the processors 502; a memory or storage system that includes the memory devices 504; and a network interface system that includes the network interface devices 506.

The computing device 500 may be arranged, in various embodiments, in many different ways. As just one example, the computing device 500 may be arranged such that the processors 502 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 500 may be arranged such that: the processors 502 include two, three, four, five, or more multi-core processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client system(s) 120, server system 100, and external systems 108 (108*a* and 108*b*), each of which may be referred to individually for clarity as a "component" herein, are implemented using an example of the computing device 500 of FIG. 5. In such embodiments, the following applies for each component: (a) the elements of the 500 computing device 500 shown in FIG. 5 (i.e., the one or more processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

The hardware configurations shown in FIG. 5 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 5, (e) via other hardware arrangements, architectures, and configurations, and/or via combinations of the technology described in (a) through (e).

Technical Advantages of Described Subject Matter

In certain example embodiments, the processing requirements for determining correlations between reference data records are decreased by tokenizing the reference data records into different subsets and then determining correlations between members of each subset. This approach can decrease the processing complexity of the correlation calculation performed between reference data records.

In certain examples, correlations values for members of a subset are determined with respect to a first member versus all other members, before determining correlations between a second member and all other members (besides the first member). Processing the correlations in this manner may improve use of the CPU cache (e.g., there may be fewer cache misses) as the data with respect to the first member may be stored for most calculations in the cache without having to access main memory or other storage of the computer system.

The technical features described herein may improve the speed at which correlations are found between reference data records and also decrease the prevalence of false-positive correlations.

The techniques herein may be used to assist in identifying market abuse. It will be appreciated that this is a difficult problem to solve because of the vast number of actions that an individual or entity can take to abuse electronic exchange computer systems. Thus, the techniques described herein, through the use of market/trade surveillance software applications, may seek to detect when market participants conduct abusive behavior like market manipulation or front running, through different, related instruments or securities. The techniques described herein may be beneficially applied to other areas such as risk management applications where one might be concerned about exposure to a particular factor that is common across different types of instruments or securities. The techniques herein may also be used to identify instruments or securities of interest to users that are interested in taking a position in a given factor (as opposed to taking a position with respect to a specific instruments or security).

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

The techniques described herein may be used in connection with exchange computer systems, which may be automated exchange computer systems (an example being the NASDAQ exchange system), that allow participants to trade in instruments that are listed on those systems. In certain cases, many instruments are related explicitly through contractual links. For example, derivative contracts such as stock option contracts define, in a non-ambiguous way, what the underlying stock is. In certain types of reference data fields, such links may be represented using unique identifiers (e.g. ISIN or ticker symbol).

However, in certain instances instruments are related to other instruments through implicit links because they share an underlying factor that might not necessarily be an identified via the traded instrument. Instead, the instruments may be implicitly linked to a commodity, an index, a rate (exchange rate or interest rate) and so on. The techniques described herein facilitate the identification of such implicit links For example, an exchange-traded fund (ETF) tracking the price of a commodity like gold is may be related to gold futures. Problematically, these two instruments might have different issuers and contract specifications (price, quantity, etc.), might actually trade on different venues, or even in different currencies or countries.

Identifying such implicit links or correlations is important in certain financial applications where an entity is interested in the position taken by a market participant in a given factor, as opposed to the position taken in a given instrument. For example, in market/trade surveillance applications, there is a need to detect when market participants perform abusive behavior like market manipulation or front running, through different, related instruments. This kind of sophisticated market abuse has been identified as being one of the main concerns for trading compliance in modern markets. The technical implementations described herein may facilitate such detection.

Although process steps, algorithms or the like, including without limitation with reference to FIGS. 3A-3B, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A data surveillance computer system for detecting manipulation in how transactions are processed across multiple disparate data transaction systems, the data surveillance computer system comprising:

at least one hardware processor that is configured to execute computer executable instructions to perform operations comprising:

processing transaction records that each correspond to a different data transaction that was processed by a corresponding transaction processing computer system of a plurality of transaction processing computer systems, each of the transaction records including a first value of a corresponding data transaction and time data for when the corresponding data transaction was processed by the corresponding transaction processing computer system, each of the transaction records being linked to a corresponding entity record of a plurality of entity records;

for each respective pair between members of a first plurality of paired entity records that are determined from the plurality of entity records, calculating a correlation value for the respective pair, wherein one of the respective pair(s) includes a first pair;

in connection with the calculating the correlation value for the first pair that is between a first entity record and a second entity record:

(a) calculating at least one common value that is based on at least one of the transaction records that are linked with the first entity record and/or the second entity record, wherein at least some of the transaction records include transaction records associated with data transactions processed by different ones of the plurality of transaction processing computer systems, and (b) for each respective transaction record of a plurality of transaction records that are linked to the first entity record and/or the second entity record, calculating a difference based on the at least one common value and the first value of the respective transaction record, wherein the correlation value for the first pair is based on the calculated difference; and storing, to data storage, the correlation value that is calculated for each pair of entity records that are determined from the plurality of entity records.

2. The data surveillance computer system of claim 1, wherein different ones of the plurality of transaction processing computer systems have different time periods for when data transactions are processed by a respective one of the plurality of transaction processing computer systems.

3. The data surveillance computer system of claim 2, wherein the at least one common value includes a common time window, which is based on the time data associated with respective ones of the transaction records, in which the plurality of transaction records fall within.

4. The data surveillance computer system of claim 1, wherein the at least one common value includes a baseline value and a common time window, wherein calculating the common time window is used to select the plurality of transaction records from among those associated with the first entity record and the second entity record, wherein calculating the difference includes calculating a difference between the baseline value and the first value of the respective transaction record.

5. The data surveillance computer system of claim 4, wherein the calculation of the baseline value is further based on calculating an average of first value that is included in multiple transaction records associated with the first entity record or the second entity record.

6. The data surveillance computer system of claim 4, wherein the calculation of the baseline value is further based on using the first value from a single one of the transaction records.

7. The data surveillance computer system of claim 1, wherein the operations further comprise:

generating a graphical user interface that includes a graph with visual representations of the first value of each respective transaction record for the first entity record and the second entity record, the graphical user interface including a display of the calculated correlation value for at least the first pair.

8. The data surveillance computer system of claim 1, wherein the operations further comprise:

executing a risk management application and using the correlation value that has been stored for at least the first pair to detect market manipulation or front running.

9. The data surveillance computer system of claim 1, wherein the operations further comprise:

generating, from among all of the entity records, a plurality of groups of entities, wherein each one of the plurality of groups of entities includes a different subset of entity records from among all of the entity records, wherein the plurality of entity records is a first group in the plurality of groups of entities.

10. The data surveillance computer system of claim 9, wherein the operations further comprise:

storing each group in the plurality of groups of entities into a graph data structure, where each group is represented within the graph data structure as a node.

11. The data surveillance computer system of claim 9, wherein each one of the plurality of groups of entities is associated with a corresponding reference token.

12. The data surveillance computer system of claim 9, wherein each of the entity records includes at least a description string, wherein the operations further comprise:

generating at least one token from each description string; and allocating each of the entity records to one of the plurality of groups of entities based on the description string for that entity record.

13. The data surveillance computer system of claim 1, wherein the calculation of the correlation value for the first pair further includes:

calculating a ratio that is based on standard deviations between those data transactions associated with the first entity record and those data transactions associated with the second entity record.

14. A method performed a data surveillance computer system for detecting manipulation in transactions that are processed by disparate data transaction systems, the method comprising:

processing transaction records that each correspond to a different data transaction that was processed by a corresponding transaction processing computer system of a plurality of transaction processing computer systems, each of the transaction records including a first value of a corresponding data transaction and time data for when the corresponding data transaction was processed by the corresponding transaction processing computer system, each of the transaction records being linked to a corresponding entity record of a plurality of entity records;

for each respective pair between members of a first plurality of paired entity records that are determined from the plurality of entity records, calculating a correlation value for the respective pair, wherein one of the respective pair(s) includes a first pair;

in connection with the calculating the correlation value for the first pair that is between a first entity record and a second entity record:

(a) calculating at least one common value that is based on at least one of the transaction records that are linked with the first entity record and/or the second entity record, wherein at least some of the transaction records include transaction records associated with data transactions processed by different ones of the plurality of transaction processing computer systems, and (b) for each respective transaction record of a plurality of transaction records that are linked to the first entity record and/or the second entity record, calculating a difference based on the at least one common value and the first value of the respective transaction record, wherein the correlation value for the first pair is based on the calculated difference; and storing, to data storage, the correlation value that is calculated for each pair of entity records that are determined from the plurality of entity records.

15. The method of claim 14, wherein different ones of the plurality of transaction processing computer systems have different time periods for when data transactions are processed by a respective one of the plurality of transaction processing computer systems.

16. The method of claim 14, wherein the at least one common value includes a baseline value and a common time window, wherein calculating the common time window is used to select the plurality of transaction records from among those associated with the first entity record and the second entity record, wherein calculating the difference includes calculating a difference between the baseline value and the first value of the respective transaction record.

17. The method of claim 14, further comprising:

generating a graphical user interface that includes a graph with visual representations of the first value of each respective transaction record for the first entity record and the second entity record, the graphical user interface including a display of the calculated correlation value for at least the first pair.

18. The method of claim 14, further comprising:

detecting, based on a stored correlation value for at least one pair of entity records, market manipulation or front running.

19. The method of claim 14, further comprising:

executing a market or trade surveillance application and using therein a stored correlation value for at least one pair of entity records.

20. A non-transitory computer readable storage medium having stored thereon computer readable instructions for use with a data surveillance computer system for detecting manipulation in transactions that are processed by disparate data transaction systems, the stored computer readable instructions comprising instructions that cause the computer system to perform operations comprising:

processing transaction records that each correspond to a different data transaction that was processed by a corresponding transaction processing computer system of a plurality of transaction processing computer systems, each of the transaction records including a first value of a corresponding data transaction and time data for when the corresponding data transaction was processed by the corresponding transaction processing computer system, each of the transaction records being linked to a corresponding entity record of a plurality of entity records;

for each respective pair between members of a first plurality of entity records that are determined to be paired from the plurality of entity records, calculating a correlation value for the respective pair, wherein one of the respective pair(s) includes a first pair;

in connection with the calculating the correlation value for the first pair that is between a first entity record and a second entity record:

(a) calculating at least one common value that is based on at least one of the transaction records that are linked with the first entity record and/or the second entity record, wherein at least some of the transaction records include transaction records associated with data transactions processed by different ones of the plurality of transaction processing computer systems, and (b) for each respective transaction record of a plurality of transaction records that are linked to the first entity record and/or the second entity record, calculating a difference based on the at least one common value and the first value of the respective transaction record, wherein the correlation value for the first pair is based on the calculated difference; and storing, to data storage, the correlation value that is calculated for each pair of entity records that are determined from the plurality of entity records.

* * * * *